(12) United States Patent
Laroia et al.

(10) Patent No.: US 8,229,427 B2
(45) Date of Patent: Jul. 24, 2012

(54) STATUS VALIDATION FOR TERMINALS IN A WIRELESS COMMUNICATION SYSTEM

(75) Inventors: Rajiv Laroia, Far Hills, NJ (US); Junyi Li, Bedminster, NJ (US); Pablo Anigstein, Gillette, NJ (US); Sathyadev Venkata Uppala, Whitehouse Station, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 627 days.

(21) Appl. No.: 11/487,259

(22) Filed: Jul. 14, 2006

(65) Prior Publication Data

US 2008/0014937 A1 Jan. 17, 2008

(51) Int. Cl.
*H04W 4/00* (2009.01)
*H04M 1/00* (2006.01)
*H04J 3/24* (2006.01)
*H04B 7/216* (2006.01)

(52) U.S. Cl. .................... 455/435.1; 455/561; 370/349; 370/335

(58) Field of Classification Search ............... 455/435.1, 455/561; 370/349, 335
See application file for complete search history.

(56) References Cited

U.S. PATENT DOCUMENTS

| | | | |
|---|---|---|---|
| 2004/0114566 A1* | 6/2004 | Lim et al. | 370/349 |
| 2005/0141462 A1* | 6/2005 | Aerrabotu et al. | 370/335 |
| 2007/0275701 A1* | 11/2007 | Jonker | 455/414.1 |

FOREIGN PATENT DOCUMENTS

| | | |
|---|---|---|
| EP | 0565506 | 10/1993 |
| EP | 1107516 | 6/2001 |
| JP | 7203535 A | 8/1995 |
| JP | 11004236 A | 1/1999 |
| JP | 2002508640 A | 3/2002 |
| JP | 2003070060 A | 3/2003 |
| JP | 2004-529562 | 9/2004 |
| JP | 2005500759 A | 1/2005 |
| JP | 2005117169 A | 4/2005 |
| WO | 9949695 | 9/1999 |
| WO | 2005065233 | 7/2005 |

OTHER PUBLICATIONS

International Search Report—PCT/US07/073532, International Search Authority—European Patent Office—Dec. 27, 2007.
Written Opinion—PCT/US07/073532, International Search Authority, European Patent Office, Dec. 27, 2007.

\* cited by examiner

*Primary Examiner* — Kamran Afshar
*Assistant Examiner* — Omoniyi Obayanju
(74) *Attorney, Agent, or Firm* — Michelle Gallardo; Nicholas J. Pauley; Jonathan T. Velasco (57) ABSTRACT

A terminal is assigned an active identifier for use while in an active state of a connection with a base station. The base station periodically broadcasts the status of the active identifiers for that base station, e.g., via status validation bits that indicate whether each active identifier is currently assigned to a terminal or not assigned to any terminal. The base station may also broadcast the identity (e.g., a scrambling mask) of the terminal assigned with each active identifier that is currently in use. If a terminal believes that it is assigned a particular active identifier, then the terminal checks the status validation bit for this active identifier. If this status validation bit indicates that the active identifier is currently in use, then the terminal may further check the scrambling mask sent for the active identifier in order to determine whether the terminal is actually assigned the active identifier.

47 Claims, 9 Drawing Sheets

STATUS VALIDATION FOR TERMINALS IN A WIRELESS COMMUNICATION SYSTEM

BACKGROUND

I. Field

The present disclosure relates generally to communication, and more specifically to techniques for determining connection status of terminals in a wireless communication system.

II. Background

A terminal in a wireless communication system (e.g., a cellular phone in a cellular system) may communicate with one or more base stations during a call. The terminal may be mobile and may be handed off from one base station to another base station as it moves about during the call. The terminal may also be sporadically active while connected with any given base station. To conserve radio resources, the terminal may be assigned radio resources while active and may be assigned no radio resources while idle.

The dynamic nature of the terminal's connections with different base stations as well as the dynamic nature of the terminal's activity may make it challenging to track the connection status of the terminal. The terminal may exchange signaling with a base station during call setup, handoff, and/or at other times as needed. The terminal and the base station may thereafter operate based on the configuration negotiated during the signaling exchange. However, an error may occur during the signaling exchange, at the terminal, and/or at the base station for whatever reason. When such an error occurs, the terminal and/or the base station may operate improperly. For example, the terminal may erroneously believe that it is assigned certain radio resources when such is not the case. In this situation, any transmission by the terminal on the radio resources may cause interference to another terminal actually assigned the radio resources. Conversely, the terminal may not realize that it has been assigned radio resources by the base station. The terminal may send no transmission on the radio resources, which would then be wasted.

There is therefore a need in the art for techniques to avoid situations in which the terminal and/or the base station have erroneous connection information.

SUMMARY

Status validation techniques that can ensure that base stations and terminals have correct connection information are described herein. A terminal may be assigned an active identifier for use while in an active state of a connection with a base station. The active identifier may be considered as an identifier for the connection.

In one aspect, the base station periodically broadcasts the status of the active identifiers for that base station. In an embodiment, the status of each active identifier is conveyed by a status validation bit that indicates whether that active identifier is currently assigned to a terminal and in use or currently not assigned to any terminal and unused. The base station may broadcast the status validation bits for all active identifiers in a broadcast channel that can be received by all terminals within the coverage of the base station. These terminals may use the status validation bits to detect state disconnect situations.

In another aspect, the base station broadcasts the identity of the terminal assigned with each active identifier that is currently in use. In an embodiment, the terminal identity is given by a scrambling mask assigned to the terminal. If a terminal believes that it is assigned a particular active identifier, then the terminal checks the status validation bit for this active identifier. If this status validation bit indicates that the active identifier is currently in use, then the terminal may further check the scrambling mask sent for the active identifier in order to determine whether the terminal is actually assigned the active identifier. Sending the scrambling mask avoids an error situation in which multiple terminals believe that they are assigned the same active identifier.

Various aspects and embodiments of the invention are described in further detail below.

BRIEF DESCRIPTION OF THE DRAWINGS

Aspects of embodiments of the invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
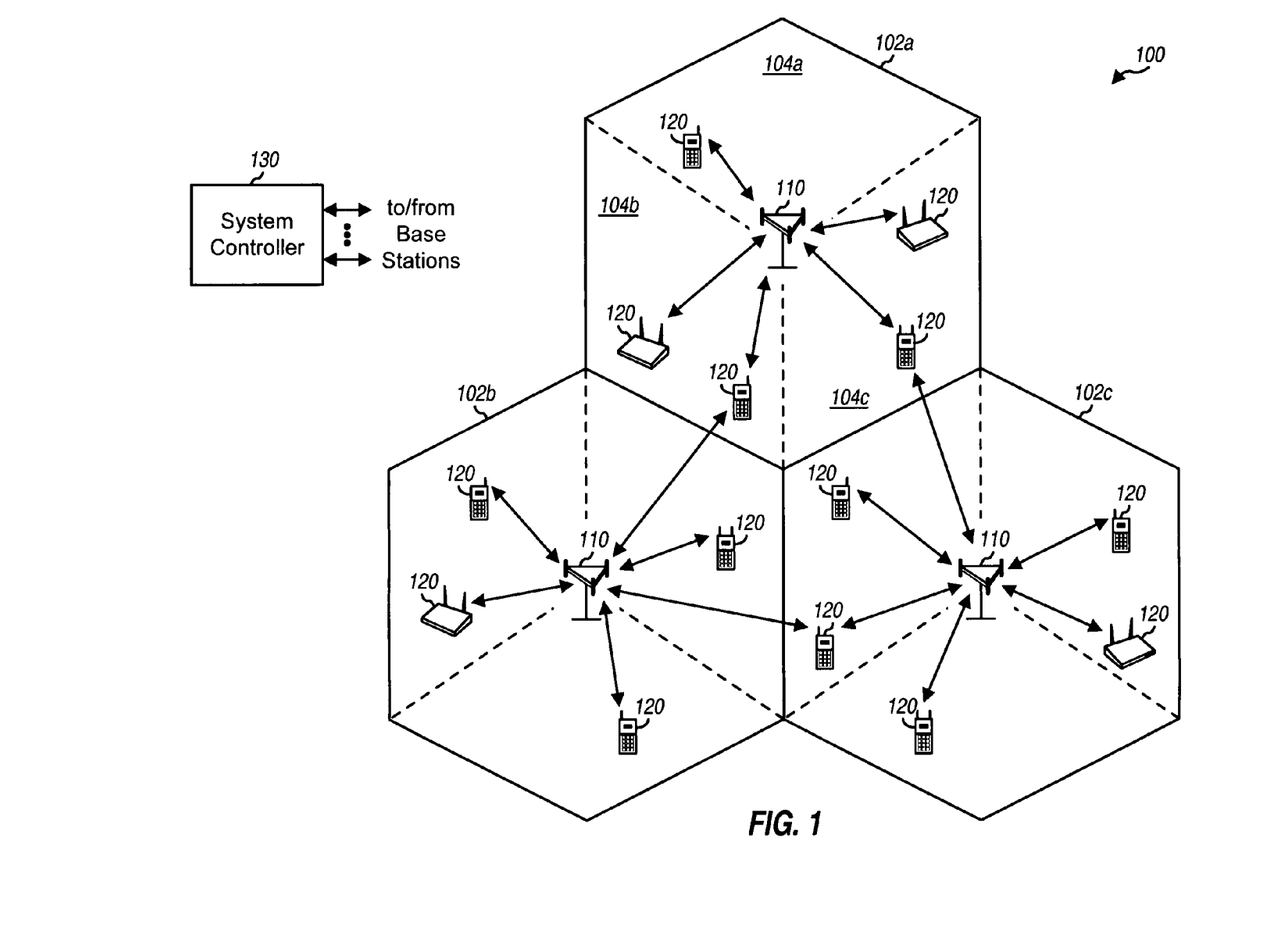
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, a Node B, an access point, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area may be served by a respective base station sector (BSS), which may also be referred to as a base transceiver subsystem (BTS). The term "sector" can refer to a BSS and/or its coverage area depending on the context in which the term is used. For a sectorized cell, the BSSs for all sectors of that cell are typically co-located within the base station for the cell. The status validation techniques described herein may be used for systems with sectorized cells as well as systems with un-sectorized cells. In the following description, the term "base station" generically refers to a station that serves a cell as well as a station that serves a sector.

For a centralized architecture, a system controller 130 couples to base stations 110 and provides coordination and control for these base stations. System controller 130 may be a single network entity or a collection of network entities. System controller 130 may also be called, and may contain some or all of the functionality of, a base station controller (BSC), a mobile switching center (MSC), a radio network controller (RNC), and/or some other network entity. For a distributed architecture, the base stations may communicate with one another as needed.

Terminals 120 may be dispersed throughout the system, and each terminal may be stationary or mobile. A terminal may also be called, and may contain some or all of the functionality of, a wireless terminal (WT), an access terminal (AT), a mobile station (MS), a user equipment (UE), a subscriber station and/or some other entity. A terminal may be a wireless device, a cellular phone, a personal digital assistant (PDA), a wireless modem, a handheld device, and so on. A terminal may communicate with one or more base stations via transmissions on the downlink and uplink. The downlink (or forward link) refers to the communication link from the base stations to the terminals, and the uplink (or reverse link) refers to the communication link from the terminals to the base stations.

The status validation techniques described herein may be used for various wireless communication systems. These techniques may also be used for various radio technologies and multiple-access schemes such as Code Division Multiple Access (CDMA), Time Division Multiple Access (TDMA), Frequency Division Multiple Access (FDMA), Orthogonal FDMA (OFDMA), Flash-OFDM®, and Single-Carrier FDMA (SC-FDMA). OFDMA and SC-FDMA partition a frequency band (e.g., the system bandwidth) into multiple orthogonal tones, which are also called subcarriers, subbands, bins, and so on. Each tone may be modulated with data. In general, modulation symbols are sent in the frequency domain with OFDMA and in the time domain with SC-FDMA. The techniques may also be used for wireless communication systems that utilize a combination of multiple-access schemes, e.g., OFDMA and CDMA.

For clarity, the status validation techniques are specifically described below for an exemplary OFDMA system. In general, the OFDMA system may utilize any tone structure with any number of total tones and any number of usable tones. In a specific embodiment, the OFDMA system utilizes a tone structure with 128 total tones and 113 usable tones. An OFDM symbol may be generated in a manner known in the art and sent in an OFDM symbol period (or simply, a symbol period).

The status validation techniques described herein may also be used with various signal structures. A signal structure indicates the manner in which data and signaling are sent. For clarity, an exemplary signal structure is described below.

Figure 2:
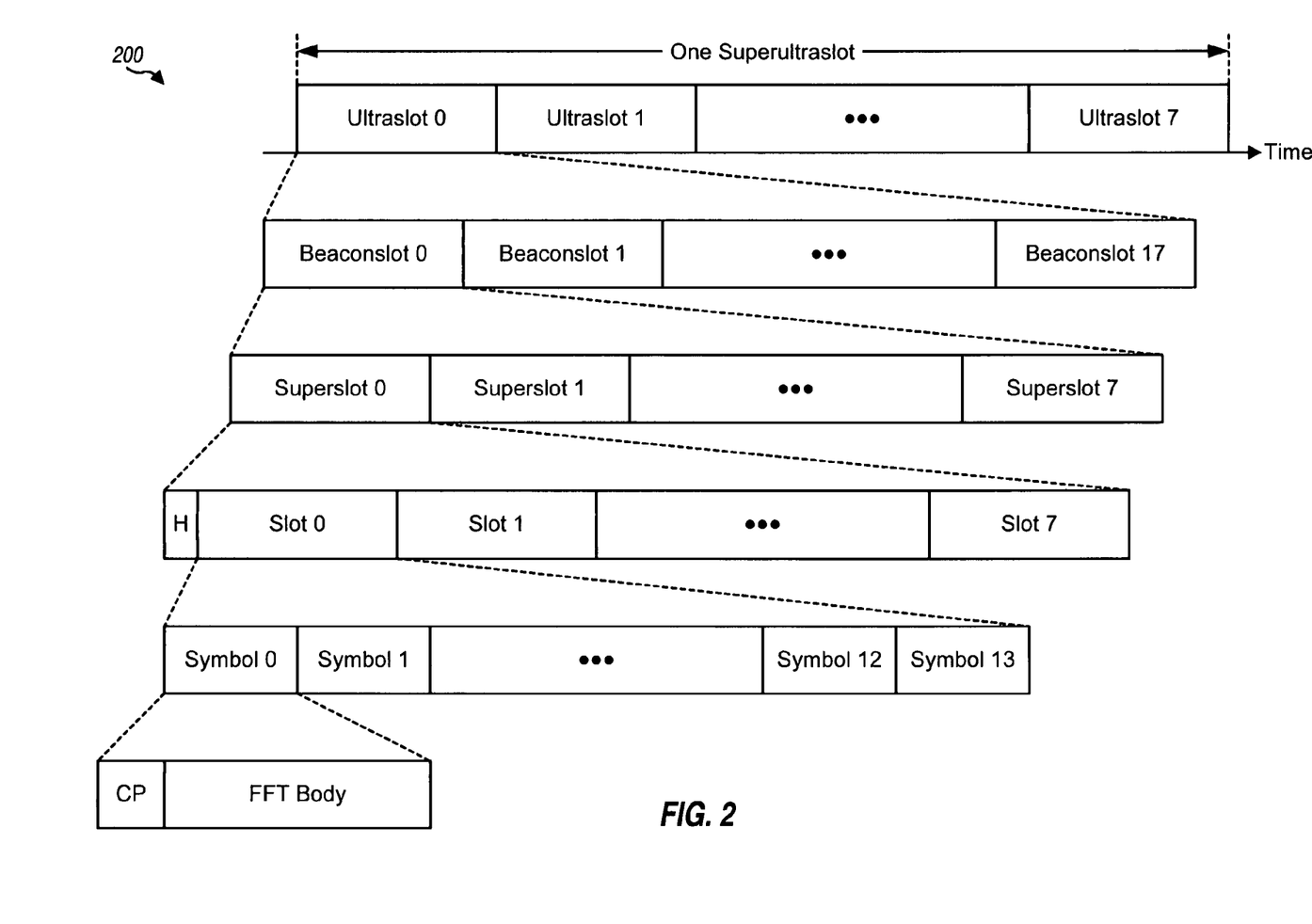
FIG. 2 shows an exemplary signal structure.

FIG. 2 shows an embodiment of a signal structure 200. The timeline for transmission is divided into superultraslots. Each superultraslot has a predetermined time duration (e.g., around 13.1 seconds) and includes eight ultraslots with indices 0 through 7. Each ultraslot includes 18 beaconslots with indices 0 through 17, and each beaconslot includes eight superslots with indices 0 through 7. Each superslot includes a header (H) followed by eight slots with indices 0 through 7. The superslot header spans two symbol periods, each slot spans 14 symbol periods, and each superslot spans 114 symbol periods. Traffic data, signaling, and/or pilot may be transmitted in each symbol period of each slot.

FIG. 2 shows a specific signal structure. Various other signal structures may also be used, and this is within the scope of the present invention. For clarity, the status validation techniques are described below for the signal structure shown in FIG. 2.

A terminal may operate in one of multiple states at any given moment. The states may also be referred to as Medium Access Control (MAC) states, operating modes, and so on.

Figure 3:
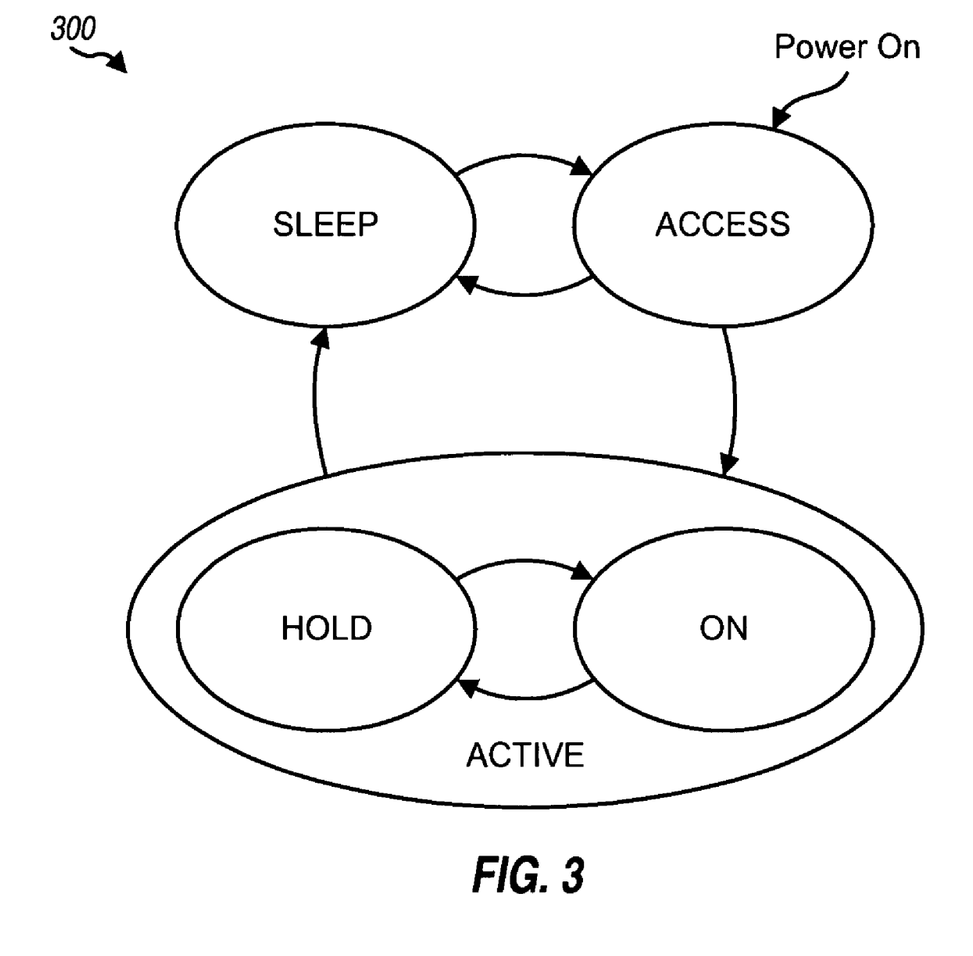
FIG. 3 shows an exemplary state diagram for a terminal.

FIG. 3 shows an embodiment of a state diagram 300 for a connection between a terminal and a base station. A connection may be considered as a collection of channels established between the terminal and the base station for the physical (PHY) and/or MAC layers.

In the embodiment shown in FIG. 3, the supported states include an ON state, a HOLD state, a SLEEP state, and an ACCESS state. The ON state and HOLD state may be considered as substates of an ACTIVE state. In the ON state, the terminal can receive data on the downlink and/or transmit data on the uplink. In the HOLD state, the terminal can receive data on the downlink but is not able to transmit data on the uplink. In an embodiment, while in the HOLD state, certain parameters (e.g., timing and transmit power) of the terminal are controlled such that the terminal can quickly transition to the ON state. In the SLEEP state, the terminal is powered down much of the time to conserve battery power. While in the SLEEP state, the terminal may be paged by the system, e.g., for an incoming call or some other reason. The terminal may transition from the SLEEP state to the ACCESS state to access the system, e.g., to initiate communication or to respond to a page. In the ACCESS state, the terminal may perform an access procedure to attempt to access the system. In general, a state diagram may have any number of states, and the states may be defined in various manners.

A terminal may establish a connection with a base station during system access. The terminal may add additional connections, as needed, with the same base station (e.g., for new traffic) or with a new base station (e.g., for handoff). The terminal may drop an existing connection whenever communication via that connection is no longer required. The terminal may thus dynamically add and drop connections with the same or different base stations to achieve the desired communication.

A base station may simultaneously support a number of connections for a number of terminals. The maximum number of connections that the base station can support is dependent on system design. The base station may dynamically add and drop connections for terminals. The base station may also dynamically allocate radio resources to terminals with established connections based on the availability of radio resources, data requirements of the terminals, and/or other factors.

A terminal and a base station may each maintain an instance of a finite state machine (FSM) for each connection established between the terminal and the base station. The FSM for each connection may indicate a specific state (e.g., one of the states in state diagram 300 in FIG. 3) that is currently applicable for that connection.

In an embodiment, a terminal is assigned an identifier for use while in the ACTIVE state of a connection. This identifier is referred to as an active identifier and is denoted as wtActiveID. The active identifier may also be called a connection ID or some other terminology.

In an embodiment, a terminal can have only one connection with a base station. In another embodiment, a terminal can have multiple connections with the same base station, in which case the terminal may be assigned different wtActiveIDs while in the ACTIVE state of these connections. For example, the multiple connections may be associated with different carrier frequencies or different blocks of tones in a given carrier frequency. In yet another embodiment, a terminal can have multiple connections with different base stations, e.g., for simultaneous transmission or handoff. In an embodiment, each base station may independently assign wtActiveIDs for all of the connections supported by that base station. Hence, if the terminal has multiple connections with different base stations, then the terminal may be assigned the same or different wtActiveIDs while in the ACTIVE state of these connections. Signaling and/or data exchanged while in the ACTIVE state of each connection may be uniquely identified by the wtActiveID for that connection.

Depending on system design, a connection or an wtActiveID may be related to the use or allocation of certain radio resources. For example, the wtActiveID may be used in control messages to identify the intended terminal. The length of the wtActiveID has an impact on the overhead of the control messages. For some control messages, such as messages used for assigning traffic channels, the wtActiveID may be a major portion of the messages, in which case it is desirable to control the length of the wtActiveID to minimize the overhead. As another example, each connection may be assigned some amount of dedicated radio resources, e.g., for control signaling purposes such as power control and timing control. Therefore, it is desirable to control the maximum number of connections and thus the length of the wtActiveIDs so as to control the radio resource overhead of such control signaling. Hence, the wtActiveIDs may be considered as a precious air interface resource. After a terminal leaves a base station, the base station should take back the wtActiveID previously used by the terminal, and may assign the wtActiveID to another terminal that desires to have a connection with the base station.

One system design objective is to reduce the time interval during which an wtActiveID is idle. Ideally, once the wtActiveID is relinquished by a first terminal, it should be assigned to a second terminal (almost) immediately. However, such a fast switch may lead to robustness issues. For example, the base station may think that the first terminal has relinquished the wtActiveID but the first terminal may think that it still has the wtActiveID, e.g., because of signaling errors. Then both the first and second terminals may think that they have the wtActiveID, which is a detrimental state disconnect condition that is resolved by the techniques described herein.

To resolve the robustness issues, in an embodiment, a terminal is assigned an identifier used to uniquely identify the terminal. This identifier may be a scrambling mask, a MAC ID, an Internet Protocol (IP) address, or some other type of ID. In an embodiment that is described in detail below, the terminal identifier is given by a scrambling mask that is denoted as wtScramblingMask. A pseudo-random number (PN) sequence may be generated with a particular generator polynomial. A scrambling mask determines the start of this PN sequence. Different terminals may be assigned different scrambling masks, and their PN sequences would then be cyclically shifted versions of the base PN sequence generated by the generator polynomial with a mask of all zeros. In general, the scrambling masks assigned to the terminals may be unique for a single base station, a set of base stations, or the entire system depending on how the scrambling masks are assigned. A terminal may use its wtScramblingMask to scramble certain data and/or signaling while in the ACTIVE state.

Unlike the wtActiveID, the terminal identifier may not be related to the use or allocation of radio resources. Therefore, the terminal identifier may not be a precious resource in the sense that the terminal identifier can have a relatively larger length. In one embodiment, each terminal has a static terminal identifier, which does not change when the terminal moves from one base station to another. In another embodiment, a terminal is dynamically assigned a terminal identifier when it is connected with a base station. In this embodiment, the base station does not have to aggressively increase the utilization of a given terminal identifier. For example, after a first terminal relinquishes a terminal identifier, the base station may keep the terminal identifier unused for some period of time, e.g., a minute, to make sure that the first terminal has indeed relinquished the terminal identifier, before the same terminal identifier is assigned to a second terminal. Thus, the probability that two terminals both think that they have the same terminal identifier is minimized.

Table 1 shows an embodiment of the wtActiveID and wtScramblingMask. In this embodiment, the wtActiveID is 7 bits and ranges from 1 to 126. A terminal may be assigned an wtActiveID for a connection established during system access. The terminal may also be assigned an wtActiveID for a connection added via an existing connection. The wtActiveID for a connection may be revoked when the terminal migrates out of the ACTIVE state for that connection. The terminal may be assigned a wtScramblingMask during system access or at some other time and may use this wtScramblingMask until revoked.

TABLE 1

| Name | Size (bits) | Description |
| --- | --- | --- |
| wtActiveID | 7 | A number 1:126 used to identify a terminal in the ACTIVE state of a connection. |
| wtScramblingMask | 16 | A number used to identify a terminal and for scrambling certain PHY channel segment in the ACTIVE state. |

In general, an active identifier (e.g., a wtActiveID) may have any size, and a terminal identifier (e.g., a wtScramblingMask) may also have any size. It is desirable to have small active identifiers since these active identifiers may be included in signaling and/or data sent over the active identifier and would then represent overhead. The active identifiers may be reused (e.g., assigned and revoked) rapidly as terminals add and drop connections and migrate in and out of the ACTIVE state. The terminal identifiers may be larger than the active identifiers, e.g., as shown in Table 1. A larger number of terminal identifiers may then be available and allow the terminal identifiers to be reused less frequently. For example, a terminal may be assigned a single terminal identifier for an extended period of time and may be assigned different active identifiers during this same time period.

A terminal may migrate from one MAC state to another MAC state for a connection with a base station. An error may occur in the process of MAC state migration. Such an error may result in a state disconnect situation in which the terminal believes that it is in one MAC state while the base station believes that the terminal is in another MAC state. The state disconnect situation may cost significant resources. For example, if the terminal believes that it is in the ACTIVE state while the base station believes that the terminal is in the SLEEP state, then the terminal may transmit on radio resources assigned to another terminal and may severely impact communication for this other terminal. Conversely, if the terminal believes that it is in the SLEEP state while the base station believes that the terminal is in the ACTIVE state, then the terminal may send no transmission on the assigned radio resources, which would be wasted.

In an aspect, a base station periodically broadcasts the status of each wtActiveID, and hence each connection, for that base station. The status of the wtActiveIDs may be conveyed in various manners. The base station may send the status of the wtActiveIDs using a synchronous method (e.g., in a predetermined portion of a broadcast channel) or an asynchronous method (e.g., in a control message that may be sent at any time, e.g., on a control channel, a traffic channel, or a broadcast channel). In an embodiment, the status of each wtActiveID is conveyed by a status validation bit that indicates whether the base station deems that wtActiveID is currently assigned to a terminal and in use or currently not assigned to any terminal and unused. A status validation bit may also be called a status bit, a status indicator, a status flag, a connection indicator, and so on. The base station may broadcast the status validation bits for all wtActiveIDs in a broadcast channel that can be reliably received by all terminals within the coverage of the base station. These terminals may use the status validation bits to detect state disconnect situations. In another embodiment, the status of each wtActiveID is conveyed by in-band signaling on a control channel or a traffic channel for that wtActiveID. The following description is for the embodiment in which the status of the wtActiveIDs is conveyed using status validation bits.

The status validation bits may be broadcast in various manners using various transmission schemes. For clarity, a specific embodiment of broadcasting the status validation bits is described below for the wtActiveID shown in Table 1.

In an embodiment, each of the assignable wtActiveIDs is mapped to a specific bit location of a broadcast channel, e.g., a downlink traffic control channel (DL.TCCH). A base station may send the status validation bit for each wtActiveID in the designated bit location for that wtActiveID. If a terminal believes that it is assigned a given wtActiveID, then the terminal may check the status validation bit sent in the bit location for that wtActiveID. The terminal can readily detect state disconnect based on the status validation bit.

In an embodiment, a base station broadcasts the status validation bits for all wtActiveIDs periodically in designated ultraslots. Each ultraslot includes 18 beaconslots as shown in FIG. 2. The base station may broadcast 126 status validation bits for 126 wtActiveIDs in 18 beaconslots, seven status validation bits in each beaconslot. Table 2 shows an embodiment of a mapping of wtActiveIDs to bit locations in the broadcast channel. In this embodiment, the broadcast channel carries, in each beaconslot, 7 signaling bits that are denoted as ACTIVE ID checks 0 through 6. The 126 wtActiveIDs are mapped to the 7 ACTIVE ID checks in the 18 beaconslots as shown in Table 2. In particular, the status validation bits for wtActiveIDs 1 through 7 are sent using ACTIVE ID checks 0 through 6, respectively, in beaconslot 0, the status validation bits for wtActiveIDs 8 through 14 are sent using ACTIVE ID checks 0 through 6, respectively, in beaconslot 1, and so on.

TABLE 2

| Broadcast Channel Parameter | Beaconslot 0 wtActiveID | Beaconslot 1 wtActiveID | ... | Beaconslot 17 wtActiveID |
|---|---|---|---|---|
| ACTIVE ID check 0 | 1 | 8 | ... | 120 |
| ACTIVE ID check 1 | 2 | 9 | ... | 121 |
| ACTIVE ID check 2 | 3 | 10 | ... | 122 |
| ACTIVE ID check 3 | 4 | 11 | ... | 123 |
| ACTIVE ID check 4 | 5 | 12 | ... | 124 |
| ACTIVE ID check 5 | 6 | 13 | ... | 125 |
| ACTIVE ID check 6 | 7 | 14 | ... | 126 |

The status validation bit for each wtActiveID is thus sent using a specific ACTIVE ID check in a specific beaconslot, which may be determined as:

$$\text{wtActiveID Num} = \text{Beaconslot Index} \times 7 + k + 1, \quad \text{Eq (1)}$$

where
Beaconslot Index $\in \{0, \ldots, 17\}$ is an index for the 18 beaconslots in an ultraslot,
$k \in \{0, \ldots, 6\}$ is an index for the 7 ACTIVE ID checks in a beaconslot, and
wtActiveID Num $\in \{1, \ldots, 126\}$ is the wtActiveID that is mapped to ACTIVE ID check k in beaconslot with index of Beaconslot Index.

Correspondingly, a terminal with a particular wtActiveID may determine the beaconslot carrying the ACTIVE ID check applicable for that wtActiveID, as follows:

$$\text{Beaconslot Index} = \text{floor}\{(\text{wtActiveID Num}-1)/7\}, \quad \text{Eq (2)}$$

where floor ( ) denotes a floor operation that returns the next lower integer for the value within the parentheses.

Figure 4:
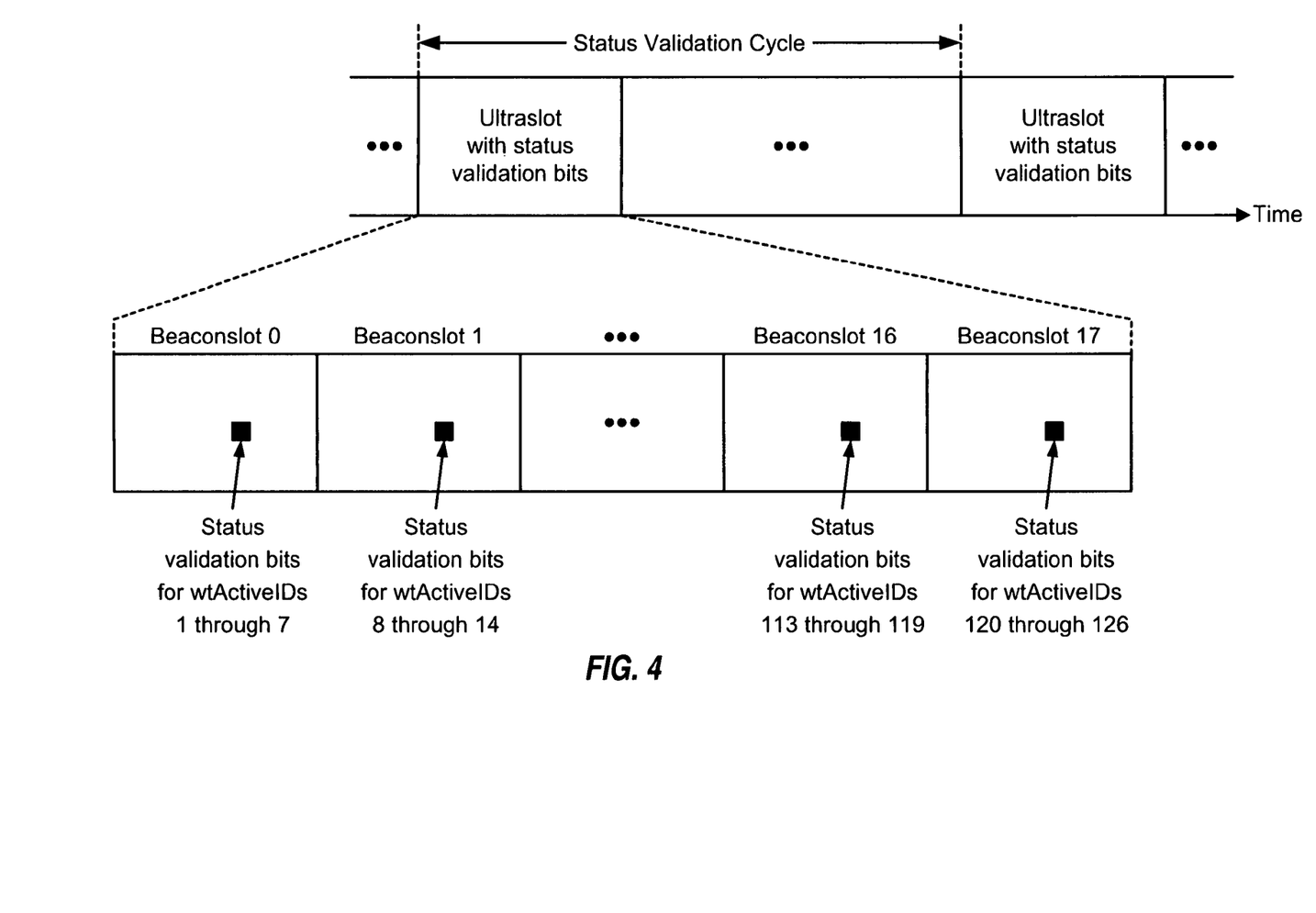
FIG. 4 shows broadcasting of status validation bits for active identifiers.

FIG. 4 shows an embodiment of broadcasting the status validation bits for the wtActiveIDs. The status validation bits may be broadcast periodically, once every status validation cycle, in designated ultraslots. For example, the status validation cycle may be equal to one superultraslot, and the status validation bits may be sent in ultraslot 0 of each superultraslot. The status validation bits may also be broadcast in every ultraslot or at some other periodicity. In each ultraslot in which the status validation bits are broadcast, status validation bits for wtActiveIDs 1 through 7 may be sent in beaconslot 0, status validation bits for wtActiveIDs 8 through 14 may be sent in beaconslot 1, and so on, and status validation bits for wtActiveIDs 120 through 126 may be sent in beaconslot 17. The status validation bits may be encoded and transmitted as described below.

In an embodiment, a base station sets the status validation bit for an wtActiveID to '1' if that wtActiveID is assigned to a terminal and sets the status validation bit to '0' if the wtActiveID is not assigned to any terminal. The base station may make the determination as to whether the wtActiveID is assigned or not assigned at a predetermined time instant, which is known to the base station and all terminals, e.g., at the beginning symbol of the current beaconslot. In an embodiment, a terminal that is in the ACTIVE state monitors the status validation bit for the wtActiveID assigned to the terminal. The status validation bit should be set to '1' since the terminal is in the ACTIVE state. Thus, if the status validation bit is set to '0', then the terminal can detect that the base station and the terminal have state disconnection. The terminal may then perform appropriate correction action, e.g., silently relinquish the wtActiveID and access the base station.

A terminal that is in the ACTIVE state may check the status validation bit for its wtActiveID to detect for status disconnect. This avoids the situation in which the terminal believes that it has a wtActiveID when the base station deems that the wtActiveID is not assigned. The converse situation may also occur in which the base station deems that a given wtActiveID has been assigned but no terminals believe that they are assigned this wtActiveID and hence do not check the status validation bit. The base station may detect this error situation using other mechanisms. For example, a terminal that is assigned a wtActiveID may be required to send certain signaling on the uplink, e.g., timing control, on a recurring basis.

If the base station detects the absence of the required signaling, then the base station may presume that state disconnect has occurred.

Multiple terminals may believe that they are assigned the same wtActiveID. For example, an error may occur for terminal x during migration from the ACTIVE state to the SLEEP state. Terminal x may believe that it is in the ACTIVE state and may continue to use a previously assigned wtActiveID. The base station may believe that terminal x is in the SLEEP state and may assign this wtActiveID to terminal y. Terminals x and y may both believe that they are assigned the same wtActiveID. If the base station sets the status validation bit for this wtActiveID to '1', then both terminals may believe that they have a valid wtActiveID. These terminals may concurrently use the wtActiveID to the detriment of both.

In another aspect, a base station broadcasts the identity of the terminal assigned with each wtActiveID that is currently in use. The assigned terminal's identity may be conveyed in various manners. In an embodiment, the terminal identity is given by the wtScramblingMask. A terminal may check the status validation bit for the wtActiveID that the terminal believes is assigned to that terminal. If this status validation bit is set to '1', then the terminal may further check the wtScramblingMask sent for this wtActiveID to determine whether the terminal is actually assigned the wtActiveID. In another embodiment, the terminal identity is conveyed by scrambling the status validation bit with the wtScramblingMask. The following description is for the embodiment in which the terminal identity is conveyed by sending the wtScramblingMask.

In an embodiment, a base station periodically broadcasts the status validation bit for each wtActiveID (e.g., in each ultraslot) and also periodically broadcasts the wtScramblingMask of the terminal currently assigned the wtActiveID (e.g., inter-mingled with the status validation bit). The base station may send the status validation bit and the wtScramblingMask for each wtActiveID in a designated bit location for that wtActiveID, e.g., as shown in Table 2.

Table 3 shows an embodiment of sending the status validation bit and the wtScramblingMask for a wtActiveID. In this embodiment, the status validation bit for the wtActiveID is sent in ultraslot 0 and indicates whether the wtActiveID is currently assigned or not assigned. If the wtActiveID is assigned, then the wtScramblingMask of the terminal currently assigned with the wtActiveID is sent in ultraslots 1 through 7. If the wtActiveID is not assigned, then in an embodiment the wtScramblingMask of the last terminal assigned with the wtActiveID is sent in ultraslots 1 through 7. In another embodiment, the base station sends the bit-wise inverse of the wtScramblingMask of the terminal that was most recently assigned but relinquished the wtActiveID. For example, if the wtScramblingMask of the terminal is 1001100111011001, then the bit-wise inverse is 0110011000100110. Sending the inverse of the wtScramblingMask allows the terminal that was last assigned the wtActiveID to quickly realize the mismatch on the wtScramblingMask and to drop out of the system. In yet another embodiment, a predetermined wtScramblingMask (e.g., all zeros) that is known to all terminals may be sent if the wtActiveID is currently not assigned. If no terminal has ever been assigned the wtActiveID, then in one embodiment, the predetermined wtScramblingMask may be sent in ultraslots 1 through 7. The predetermined wtScramblingMask should not be assigned to any terminal.

TABLE 3

| Ultraslot | Description |
|---|---|
| Ultraslot 0 | ACTIVE ID check k is set to '1' if the corresponding wtActiveID is assigned to a terminal. ACTIVE ID check k is set to '0' if no terminal is assigned the wtActiveID. |
| Ultraslot m $m = 1, \ldots, 7$ | If the corresponding wtActiveID is assigned, then ACTIVE ID check k is set to the m-th bit of the wtScramblingMask ($Z_m$) of the terminal currently assigned the wtActiveID. If the corresponding wtActiveID is not assigned, the ACTIVE ID check k is set to $Z_m$ of the terminal last assigned the wtActiveID. |

Figure 5:
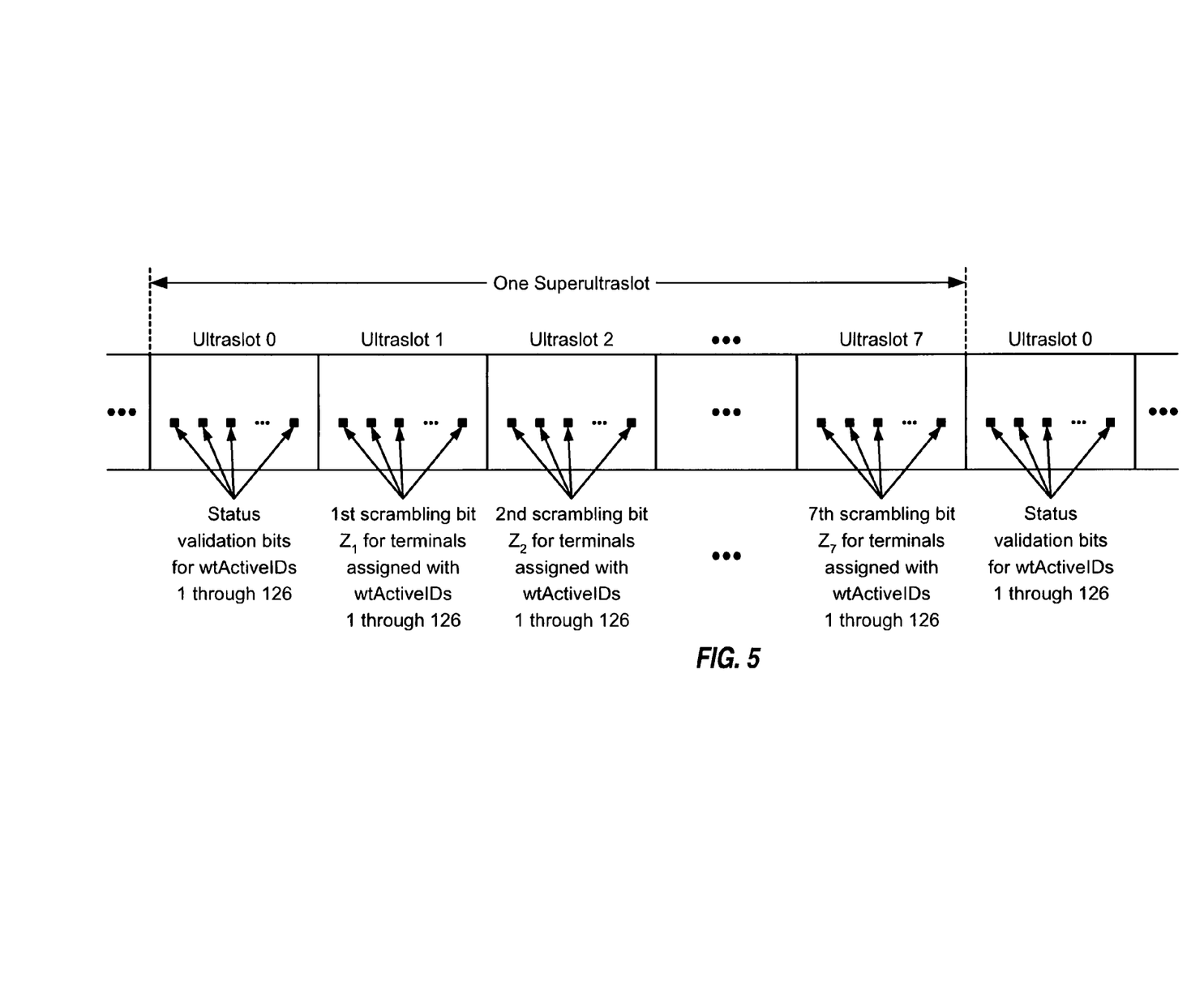
FIG. 5 shows broadcasting of status validation bits for active identifiers and scrambling masks of terminals assigned with the active identifiers.

FIG. 5 shows an embodiment of broadcasting the status validation bits for the wtActiveIDs and the wtScramblingMasks of the terminals assigned with the wtActiveIDs. In this embodiment, the status validation bits are broadcast periodically, once every superultraslot, in ultraslot 0, e.g., as shown in FIG. 4. The 1st bit of the wtScramblingMasks for the terminals (currently or last) assigned with the wtActiveIDs are broadcast in ultraslot 1 using the same ACTIVE ID checks. The 2nd bit of the wtScramblingMasks for the terminals currently or last assigned with the wtActiveIDs are broadcast in ultraslot 2. The 3rd through 7th bits of the wtScramblingMasks are broadcast in ultraslot 3 through 7, respectively, in similar manner. At the start of each beaconslot, the base station may determine the current status of the 7 wtActiveIDs to be sent in that beaconslot and determine the values of the 7 ACTIVE ID checks, e.g., as shown in Table 3.

In the embodiment shown in FIG. 5, only a subset of the scrambling bits in the wtScramblingMask for each wtActiveID is broadcast. In this embodiment, the wtActiveIDs and/or the wtScramblingMasks may be assigned to the terminals in a manner to avoid ambiguity. For example, a given wtActiveID may be assigned to a new terminal having a wtScramblingMask in which scrambling bits 1 through 7 are different from those of the last terminal assigned with this wtActiveID. In another embodiment, more or all of the scrambling bits are sent. For example, scrambling bits 0 through 6 may be sent in one superultraslot, scrambling bits 7 through 13 may be sent in another superultraslot, and scrambling bits 14 and 15 may be sent in yet another superultraslot.

In general, status information (e.g., status validation bits and wtScramblingMasks) may be sent in various manners using various coding and modulation schemes. For clarity, a specific embodiment of transmitting status information using the ACTIVE ID checks shown in Tables 2 and 3 is described below. These ACTIVE ID checks may carry status validation bits in some beaconslots and wtScramblingMasks in some other beaconslots, as shown in FIGS. 4 and 5.

In an embodiment, the ACTIVE ID checks are sent using flash processing, which performs encoding, symbol mapping, and tone mapping jointly. The 7 ACTIVE ID checks to be sent in a given beaconslot may be denoted as $b_6, b_5, b_4, \ldots, b_0$. Information bits $b_4, \ldots, b_0$ may be given in a 1×5 vector $\underline{b}$, as follows:

$$\underline{b} = [b_4 b_3 b_2 b_1 b_0]. \qquad \text{Eq (3)}$$

A 5×16 generator matrix $\underline{G}$ may be defined as follows:

$$\underline{G} = \begin{bmatrix} 1 & 0 & 0 & 0 & 0 & 0 & 0 & 1 & 0 & 1 & 0 & 1 & 1 & 1 & 1 & 1 \\ 0 & 1 & 0 & 0 & 0 & 1 & 1 & 0 & 1 & 1 & 0 & 0 & 0 & 1 & 1 & 1 \\ 0 & 0 & 1 & 0 & 0 & 0 & 1 & 1 & 1 & 0 & 1 & 0 & 1 & 1 & 0 & 1 \\ 0 & 0 & 0 & 1 & 0 & 1 & 0 & 1 & 1 & 0 & 1 & 1 & 0 & 0 & 1 & 1 \\ 0 & 0 & 0 & 0 & 1 & 1 & 1 & 0 & 0 & 1 & 1 & 1 & 1 & 0 & 0 & 1 \end{bmatrix} \quad \text{Eq (4)}$$

Code bits may be generated for information bits $b_4, \ldots, b_0$, as follows:

$$\underline{c} = \underline{b} \cdot \underline{G}, \quad \text{Eq (5)}$$

where $\underline{c}[c_{15} \, c_{14} \ldots c_1 \, c_0]$ is a 1×16 row vector containing 16 code bits. The 16-bit codes may be further encoded with another coding scheme to provide additional coding protection to ensure that the status information can be reliably received even by a disadvantaged terminal with the worst-case channel conditions. One exemplary coding scheme is a flash encoding scheme. The status information may also be sent in other manners using other coding and modulation schemes, tone mapping schemes, and so on. For example, the ACTIVE ID checks may be encoded and sent separately so that a terminal can receive only the bit(s) of interest. The ACTIVE ID checks may also be jointly encoded and modulated to generate a set of modulation symbols, which may be mapped to a fixed set of tone-symbols. Each ACTIVE ID check, a subset of the ACTIVE ID checks, or all ACTIVE ID checks may also be combined with other information bits and encoded into a single codeword that may then be broadcast to the terminals.

Figure 6:
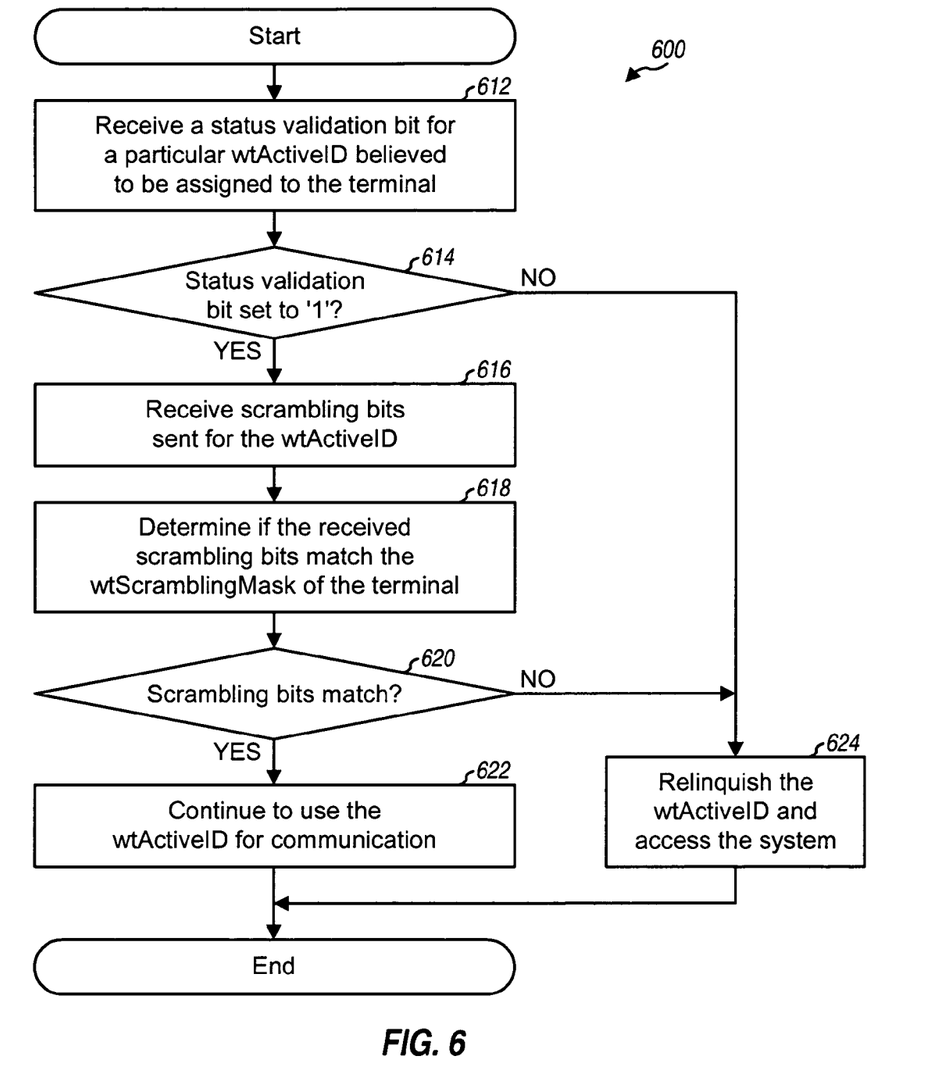
FIG. 6 shows a process performed by a terminal for status validation.

FIG. 6 shows an embodiment of a process 600 performed by a terminal for status validation. Process 600 is for the embodiment shown in FIG. 5. The terminal receives a status validation bit for a particular wtActiveID that is believed to be assigned to the terminal (block 612). This status validation bit may be broadcast periodically (e.g., once every superultraslot in ultraslot 0) in a designated bit location of a broadcast channel. The terminal determines whether the status validation bit is set to '1', indicating that the corresponding wtActiveID is assigned (block 614). If the status validation bit is set to '0', then the terminal relinquishes the wtActiveID and accesses the system (block 624).

Otherwise, if the status validation bit is set to '1', then the terminal receives scrambling bits sent for the wtActiveID (block 616). These scrambling bits are for the wtScramblingMask of the terminal deemed by the base station to be assigned the wtActiveID. The scrambling bits may be sent (e.g., in ultraslots 1 through 7) in the same bit location used for the status validation bit. The terminal determines if the received scrambling bits for the wtActiveID match the wtScramblingMask of the terminal (block 618). If the scrambling bits match, as determined in block 620, then the terminal continues to use the wtActiveID for communication (block 622). Otherwise, the terminal relinquishes the wtActiveID and accesses the system (block 624).

As shown in FIG. 6, if the terminal believes that it is assigned a particular wtActiveID, then the terminal may check the status validation bit for that wtActiveID. The terminal can readily detect state disconnect based on the status validation bit. The terminal can also readily detect that it is actually assigned the wtActiveID based on the scrambling bits sent for the wtActiveID.

The terminal may check the status validation bit for its wtActiveID and then check the scrambling bits sent for the wtActiveID, as shown in FIG. 6. The terminal may also check the scrambling bits prior to checking the status validation bit. The terminal has system timing and knows when each scrambling bit is sent. If any scrambling bit sent for the wtActiveID does not match the wtScramblingMask of the terminal, then the terminal can quickly ascertain that it is not assigned the wtActiveID.

Specific embodiments of sending status information for active identifiers have been described above. The status information may comprise status validation bits for active identifiers and scrambling masks for terminals, as described above. The status information may also comprise different and/or additional information. For example, the status information may comprise only status validation bits, e.g., as shown in FIG. 4. The status information may also comprise only scrambling masks sent for active identifiers that are currently assigned and all zeros for active identifiers that are currently not assigned. Other types of identifier may also be used for the terminals besides scrambling masks.

The status information may also be sent in other manners. The status validation bits may be sent in designated bit locations of a broadcast channel, e.g., as shown in Table 2. The status validation bits may also be sent in a single message. The scrambling masks may be sent as shown in Table 3 and FIG. 5. The scrambling masks may also be sent such that (1) one scrambling bit is sent whenever the status validation bits are sent and (2) the 16 scrambling bits are cycled through after 16 transmissions of the status validation bits.

In general, the status information may comprise any type of information and any combination of information. The status information may also be sent using various formats, coding and modulation schemes, waveforms, periodicity, tones, symbol periods, and so on.

Figure 7:
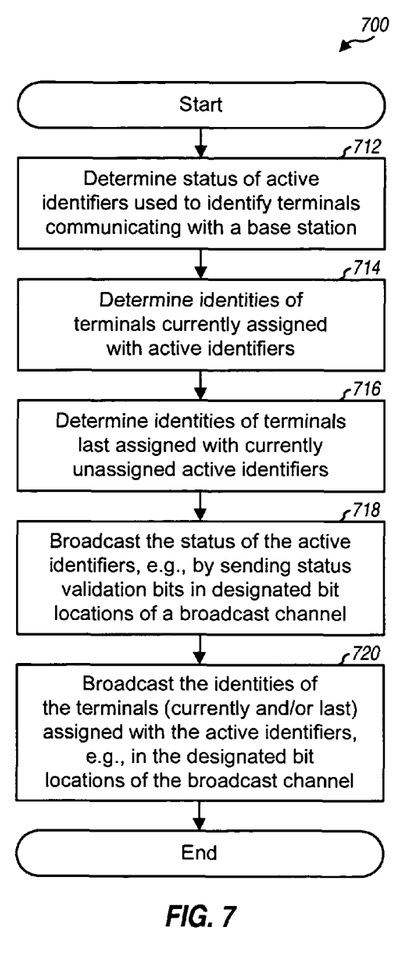
FIG. 7 shows a process performed by a base station to support status validation.

FIG. 7 shows an embodiment of a process 700 performed by a base station to support status validation by terminals under the coverage of the base station. The base station may assign active identifiers to terminals having connections with the base station and operating in an active state. The base station may revoke the active identifiers of terminals migrating out of the active state.

The base station determines the status of active identifiers used to identify terminals communicating with the base station (block 712). These active identifiers may also be referred to as wtActiveIDs, connection IDs, or some other terminology. For block 712, the base station may determine the active identifiers currently assigned to terminals and the active identifiers currently not assigned to any terminals. The base station determines the identities of terminals currently assigned with active identifiers (block 714) and determines the identities of terminals last assigned with currently unassigned active identifiers (block 716). The base station may make the determination in blocks 712, 714 and 716 at a predetermined time instant that is known to all terminals.

The base station broadcasts the status of the active identifiers (block 718). The status of each active identifier may be conveyed by a respective status validation bit that indicates whether the active identifier is currently assigned or not assigned. The base station may send the status validation bit for each active identifier in a designated bit location of a broadcast channel. The base station also broadcasts the identities of the terminals (currently and/or last) assigned with the active identifiers (block 720). The identities of the terminals may be given by scrambling masks or some other type of identifiers assigned to the terminals. The identities of the terminals may also be sent in various different manners and/or using various formats. For example, the identities of the terminals currently assigned with the active identifiers may be sent without bit-wise inversion whereas the identities of the terminals last assigned with the active identifiers may be sent with bit-wise inversion The base station may broadcast the status of the active identifiers periodically in each predetermined time interval, e.g., each superultraslot. The base station may broadcast the status of the active identifiers in time slots designated for sending the status, e.g., in a first subset of ultraslots or the first ultraslot of each superultraslot. The base station may broadcast the identities of terminals (currently and/or last) assigned with the active identifiers in time slots designated for sending the identities of the terminals, e.g., in a second subset of ultraslots or the second through last ultraslots or each superultraslot. The base station may broadcast a different bit of the scrambling masks in each of the second through last ultraslots. The base station may also send the status information in control messages.

Figure 8:
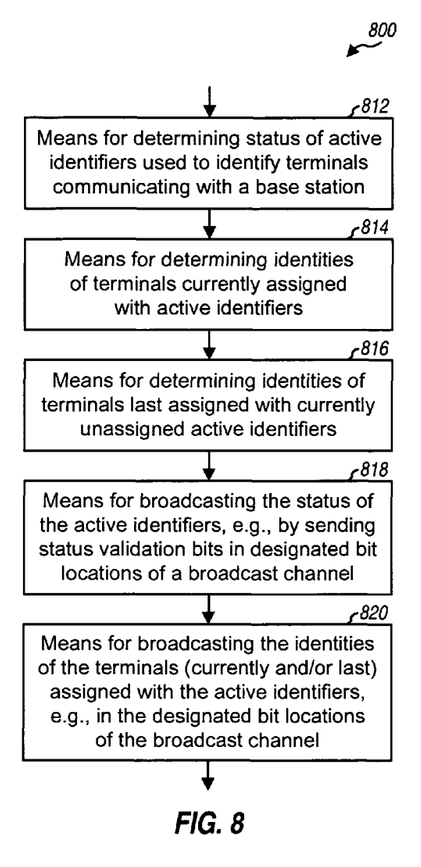
FIG. 8 shows an apparatus that supports status validation.

FIG. 8 shows an embodiment of an apparatus 800 that supports status validation. Apparatus 800 includes means for determining the status of active identifiers used to identify terminals communicating with a base station (block 812), means for determining the identities of terminals currently assigned with active identifiers (block 814), means for determining the identities of terminals last assigned with currently unassigned active identifiers (block 816), means for broadcasting the status of the active identifiers (block 818), and means for broadcasting the identities of the terminals currently or last assigned with the active identifiers (block 820).

Figure 9:
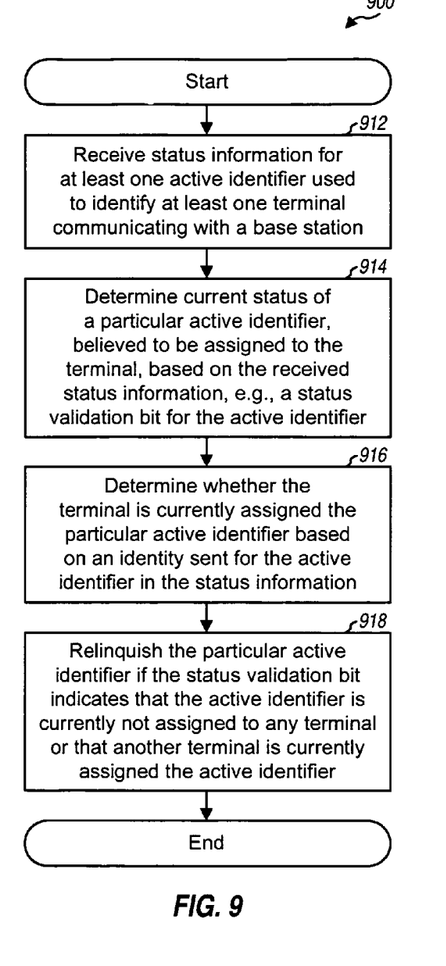
FIG. 9 shows a process performed by a terminal for status validation.

FIG. 9 shows an embodiment of a process 900 performed by a terminal for status validation. The terminal receives status information for at least one active identifier used to identify at least one terminal communicating with a base station (block 912). The terminal determines the current status of a particular active identifier, believed to be assigned to the terminal, based on the received status information (block 914). The status information may comprise at least one status validation bit indicating whether each of the at least one active identifier is assigned or not assigned. The terminal may then obtain a status validation bit for the particular active identifier and may determine the current status of this active identifier based on the status validation bit.

The terminal determines whether it is currently assigned the particular active identifier based on an identity sent for the active identifier in the status information (block 916). The identities of the terminals may be given by scrambling masks. The terminal may obtain a scrambling mask sent for the active identifier and may determine whether it is currently assigned the active identifier based on the scrambling mask. The terminal relinquishes the active identifier if the status validation bit indicates that the active identifier is currently not assigned to any terminal or that another terminal is currently assigned the active identifier (block 918). The terminal may receive the status information on a recurring basis, e.g., periodically in each predetermined time interval. The terminal may receive the status validation bit and the scrambling mask for the active identifier in designated bit location and time slots.

Figure 10:
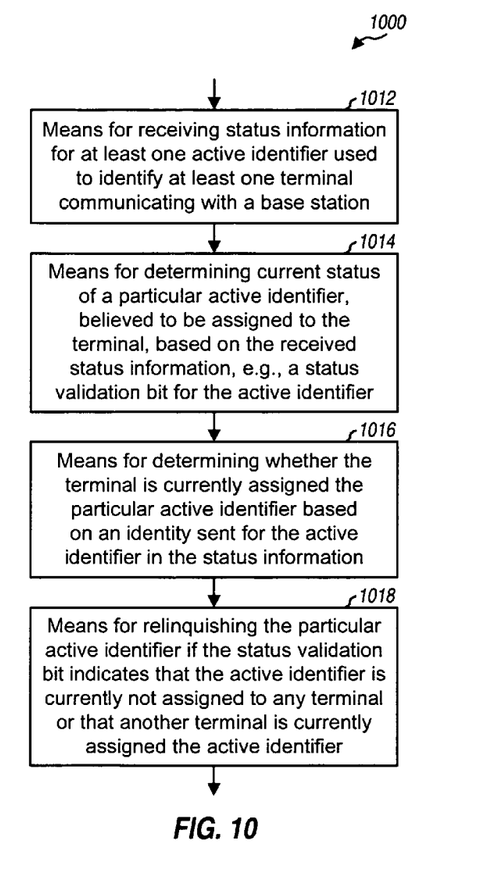
FIG. 10 shows an apparatus that performs status validation.

FIG. 10 shows an embodiment of an apparatus 1000 that performs status validation. Apparatus 1000 includes means for receiving, at a terminal, status information for at least one active identifier used to identify at least one terminal communicating with a base station (block 1012), means for determining the current status of a particular active identifier, believed to be assigned to the terminal, based on the received status information (block 1014), means for determining whether the terminal is currently assigned the active identifier based on an identity sent for the active identifier in the status information (block 1016), and means for relinquishing the active identifier if the status validation bit indicates that the active identifier is currently not assigned to any terminal or that another terminal is currently assigned the active identifier (block 1018).

The status validation techniques described herein may also be used for other purposes. For example, the MAC state of each terminal may be conveyed using the techniques described herein. As another example, requests for certain information from the terminals may be sent using the techniques.

Figure 11:
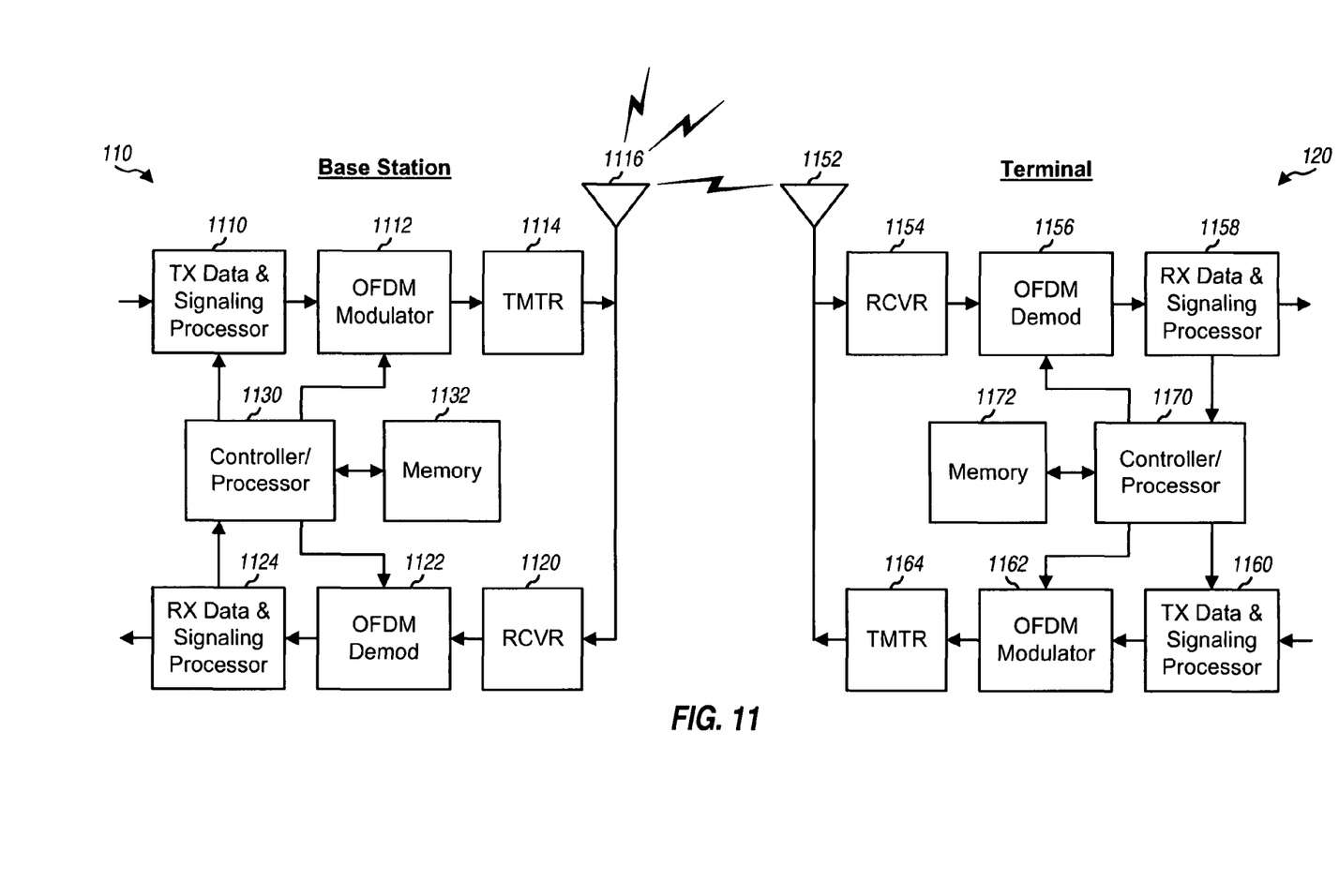
FIG. 11 shows a block diagram of a base station and a terminal.

FIG. 11 shows a block diagram of an embodiment of a base station 110 and a terminal 120 in FIG. 1. At base station 110, a transmit (TX) data and signaling processor 1110 receives traffic data for the terminals being served and signaling (e.g., status information). Processor 1110 processes (e.g., formats, encodes, interleaves, and symbol maps) the traffic data, signaling, and pilot and provides output symbols. Processor 1110 may perform the flash processing for the status information, e.g., as described above. An OFDM modulator 1112 performs OFDM modulation on the output symbols and generates OFDM symbols. A transmitter (TMTR) 1114 conditions (e.g., converts to analog, filters, amplifies, and upconverts) the OFDM symbols to generate a downlink signal, which is transmitted via an antenna 1116.

At terminal 120, an antenna 1152 receives downlink signals from base station 110 and other base stations and provides a received signal to a receiver (RCVR) 1154. Receiver 1154 conditions and digitizes the received signal and provides samples. An OFDM demodulator (Demod) 1156 performs OFDM demodulation on the samples and provides frequency-domain symbols. A receive (RX) data and signaling processor 1158 processes (e.g., symbol demaps, deinterleaves, and decodes) the frequency-domain symbols and provides decoded data and signaling for terminal 120. Processor 1158 may perform flash detection/decoding for the status information. On the uplink, a TX data and signaling processor 1160 generates output symbols for traffic data, signaling, and pilot to be sent to base station 110. An OFDM modulator 1162 performs OFDM modulation on the output symbols and generates OFDM symbols. A transmitter 1164 conditions the OFDM symbols and generates an uplink signal, which is transmitted via antenna 1152.

At base station 110, the uplink signals from terminal 120 and other terminals are received by antenna 1116, conditioned and digitized by a receiver 1120, demodulated by an OFDM demodulator 1122, and processed by an RX data and signaling processor 1124 to recover the traffic data and signaling sent by terminal 120 and other terminals.

Controllers/processors 1130 and 1170 direct the operation of various processing units at base station 110 and terminal 120, respectively. Controller/processor 1130 may support status validation, determine the status of the active identifiers assignable by base station 110, and generate status information for the active identifiers. Controller/processor 1130 may perform process 700 in FIG. 7 and/or other processes. Controller/processor 1170 may perform status validation for terminal 120, receive status information from processor 1158, and determine the current status of the active identifier for terminal 120. Controller/processor 1170 may perform process 600 in FIG. 6, process 900 in FIG. 9, and/or other processes. Memories 1132 and 1172 store program codes and data for base station 110 and terminal 120, respectively.

The status validation techniques described herein may be implemented by various means. For example, these techniques may be implemented in hardware, firmware, software, or a combination thereof. For a hardware implementation, the processing units at a terminal or a base station used for status validation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the status validation techniques may be implemented with modules (e.g., procedures, functions, and so on) that perform the functions described herein. The firmware and/or software codes may be stored in a memory (e.g., memory 1132 or 1172 in FIG. 11) and executed by a processor (e.g., processor 1130 or 1170). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor configured to determine a status of all active identifiers associated with a base station, each active identifier identifying an allocation of radio resource to an active terminal associated with the base station, each status indicating whether a particular active identifier is assigned;
    the at least one processor configured to broadcast the statuses of the active identifiers in a broadcast channel within the coverage of the base station; and
    a memory coupled to the at least one processor.

2. The apparatus of claim 1, wherein the at least one processor is configured to determine the status of the active identifiers at a predetermined time known to the terminals associated with the base station.

3. The apparatus of claim 1, wherein the status of each active identifier is conveyed by a respective status validation bit that indicates whether the active identifier is currently assigned or not assigned.

4. The apparatus of claim 1, wherein for each of the active identifiers the at least one processor is configured to set a status validation bit for the active identifier to a first value if the active identifier is assigned to a terminal, and to set the status validation bit to a second value if the active identifier is not assigned to any terminal.

5. The apparatus of claim 4, wherein the at least one processor is configured to send the status validation bit for each active identifier in a designated bit location of a broadcast channel.

6. The apparatus of claim 4, wherein the at least one processor is configured to encode a set of at least one status validation bit for a set of at least one active identifier with other information bits into a single codeword, and to broadcast the single codeword.

7. The apparatus of claim 1, wherein the at least one processor is configured to determine active identifiers currently assigned to terminals and to broadcast identities of the terminals currently assigned with active identifiers.

8. The apparatus of claim 7, wherein the at least one processor is configured to determine active identifiers currently not assigned to terminals and to broadcast information for identities of terminals last assigned with the currently unassigned active identifiers.

9. The apparatus of claim 7, wherein the at least one processor is configured to determine active identifiers currently not assigned to terminals and to broadcast a predetermined identity, known to the terminals, for the currently unassigned active identifiers.

10. The apparatus of claim 7, wherein the identities of the terminals are given by scrambling masks.

11. The apparatus of claim 1, wherein the at least one processor is configured to broadcast the status of the active identifiers in time slots designated for sending the status, and to broadcast identities of terminals currently assigned with active identifiers in time slots designated for sending the identities of the terminals.

12. The apparatus of claim 1, wherein the status of each active identifier is conveyed by a respective status validation bit that indicates whether the active identifier is currently assigned or not assigned, and wherein the at least one processor is configured to broadcast status validation bits for the active identifiers in a first subset of ultraslots of a superultraslot, and to broadcast scrambling masks of terminals currently assigned with active identifiers in a second subset of ultraslots of the superultraslot.

13. The apparatus of claim 12, wherein the first subset comprises a first ultraslot the superultraslot and the second subset comprises second through last ultraslots of the superultraslot.

14. The apparatus of claim 13, wherein the at least one processor is configured to broadcast a different bit of the scrambling masks in each of the second through last ultraslots.

15. The apparatus of claim 1, wherein the at least one processor is configured to broadcast the status of the active identifiers periodically in each predetermined time interval.

16. The apparatus of claim 1, wherein the at least one processor is configured to assign active identifiers to terminals having connections with the base station and operating in an active state.

17. The apparatus of claim 16, wherein the at least one processor is configured to revoke active identifiers of terminals migrating out of the active state.

18. The apparatus of claim 1, wherein the at least one processor is configured to perform encoding, symbol mapping, and tone mapping jointly for the status of the active identifiers.

19. The apparatus of claim 1, wherein the at least one processor is configured to send the status of the active identifiers via at least one control message.

20. A method comprising:
    determining a status of all active identifiers associated with a base station, each active identifier identifying an allocation of radio resource to an active terminal associated with the base station, each status indicating whether a particular identifier is assigned; and
    broadcasting the statuses of the active identifiers in a broadcast channel within coverage of the base station.

21. The method of claim 20, further comprising:
    setting a status validation bit for each of the active identifiers to a first value if the active identifier is assigned to a terminal; and
    setting the status validation bit for each active identifier to a second value if the active identifier is not assigned to any terminal.

22. The method of claim 20, wherein the broadcasting the status of the active identifiers comprises sending a status validation bit for each active identifier in a designated bit location of a broadcast channel.

23. The method of claim 20, further comprising:
determining active identifiers currently assigned to terminals; and
broadcasting identities of terminals currently assigned with active identifiers.

24. An apparatus comprising:
means for determining a status of all active identifiers associated with a base station, each active identifier identifying an allocation of radio resource to an active terminal associated with the base station, each status indicating whether a particular active identifier is assigned; and
means for broadcasting the statuses of the active identifiers in a broadcast channel within coverage of the base station.

25. The apparatus of claim 24, further comprising:
means for setting a status validation bit for each of the active identifiers to a first value if the active identifier is assigned to a terminal; and
means for setting the status validation bit for each active identifier to a second value if the active identifier is not assigned to any terminal.

26. The apparatus of claim 24, wherein the means for broadcasting the status of the active identifiers comprises
means for sending a status validation bit for each active identifier in a designated bit location of a broadcast channel.

27. The apparatus of claim 24, further comprising:
means for determining active identifiers currently assigned to terminals; and
means for broadcasting identities of terminals currently assigned with active identifiers.

28. A memory including instructions stored thereon, wherein execution of the instructions is for:
determining a status of all active identifiers associated with a base station, each active identifier identifying an allocation of resource to an active terminal associated with the base station, each status indicating whether a particular active identifier is assigned; and
initiating broadcast of the statuses of the active identifiers in a broadcast channel within coverage of the base station.

29. A terminal comprising:
at least one processor configured to receive status information comprising a status for all active identifiers associated with a base station, each active identifier identifying an allocation of a radio resource to an active terminal associated with the base station, each status indicating whether a particular active identifier is assigned, and to determine current status of a particular active identifier based on the received status information; wherein the statuses are received on a broadcast channel within coverage of the base station; and
a memory coupled to the at least one processor.

30. The terminal of claim 29, wherein the status information comprises at least one status validation bit indicating whether each active identifier is assigned or not assigned.

31. The terminal of claim 30, wherein the at least one processor is configured to obtain a status validation bit for the particular active identifier and to determine the current status of the particular active identifier based on the status validation bit.

32. The terminal of claim 31, wherein the at least one processor is configured to relinquish the particular active identifier if the status validation bit indicates that the particular active identifier is currently not assigned to any terminal.

33. The terminal of claim 31, wherein the at least one processor is configured to receive the status validation bit for the particular active identifier on a recurring basis.

34. The terminal of claim 29, wherein the status information comprises identities of terminals currently assigned active identifiers.

35. The terminal of claim 34, wherein the at least one processor is configured to determine whether the terminal is currently assigned the particular active identifier based on an identity sent for the particular active identifier in the status information.

36. The terminal of claim 34, wherein the identities of the terminals are given by scrambling masks, and wherein the at least one processor is configured to obtain from the status information a scrambling mask sent for the particular active identifier, and to determine whether the terminal is currently assigned the particular active identifier based on the scrambling mask.

37. The terminal of claim 36, wherein the at least one processor is configured to relinquish the particular active identifier if the scrambling mask indicates that another terminal is currently assigned the particular active identifier.

38. The terminal of claim 29, wherein the at least one processor is configured to receive a status validation bit indicating whether the particular active identifier is assigned or not assigned in time slots designated for sending the status validation bit, and to receive a scrambling mask of a terminal deemed to be assigned the particular active identifier in time slots designated for sending the scrambling mask.

39. The terminal of claim 29, wherein the at least one processor is configured to receive a status validation bit for the particular active identifier in a first ultraslot of a superultraslot, and to receive a scrambling mask of a terminal deemed to be assigned the particular active identifier in second through last ultraslots of the superultraslot.

40. The terminal of claim 39, wherein the at least one processor is configured to receive a different bit of the scrambling mask in each of the second through last ultraslots.

41. A method comprising:
receiving, over a broadcast channel, at a terminal, status information comprising statuses for all active identifiers associated with abuse station, an active identifier identifying an allocation of a radio resource to an active terminal associated with the base station, each status indicating whether a particular active identifier is assigned; and
determining current status of a particular active identifier based on the received status information.

42. The method of claim 41, wherein the determining the current status of the particular active identifier comprises
obtaining a status validation bit for the particular active identifier, and
determining the current status of the particular active identifier based on the status validation bit.

43. The method of claim 41, further comprising;
determining whether the terminal is currently assigned the particular active identifier based on an identity sent for the particular active identifier in the status information.

44. An apparatus comprising:
means for receiving, over a broadcast channel, status information comprising statuses for all active identifiers associated with a base station, an active identifier identifying an allocation of a radio resource to an active terminal associated with the base station, each status indicating whether a particular active identifier is assigned; and means for determining current status of a particular active identifier based on the received status information.

45. The apparatus of claim 44, wherein the means for determining the current status of the particular active identifier comprises means for obtaining a status validation bit for the particular active identifier, and means for determining the current status of the particular active identifier based on the status validation bit.

46. The apparatus of claim 44, further comprising:

means for determining whether the terminal is currently assigned the particular active identifier based on an identity sent for the particular active identifier in the status information.

47. A memory including instructions stored thereon, wherein execution of the instructions is for:

receiving status information comprising a status for all active identifiers associated with a base station, each active identifier identifying an allocation of a radio resource to an active terminal associated with the base station, each status indicating whether a particular active identifier is assigned, wherein the statuses are received on a broadcast channel coverage of the base station; and determining current status of a particular active identifier based on the received status information.

\* \* \* \* \*